US011495264B2

(12) United States Patent
Cai et al.

(10) Patent No.: US 11,495,264 B2
(45) Date of Patent: Nov. 8, 2022

(54) METHOD AND SYSTEM OF CLIPPING A VIDEO, COMPUTING DEVICE, AND COMPUTER STORAGE MEDIUM

(71) Applicant: Shanghai Bilibili Technology Co., Ltd., Shanghai (CN)

(72) Inventors: Heming Cai, Shanghai (CN); Long Qian, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 65 days.

(21) Appl. No.: 17/079,662

(22) Filed: Oct. 26, 2020

(65) Prior Publication Data

US 2021/0125639 A1   Apr. 29, 2021

(51) Int. Cl.
*G11B 27/02* (2006.01)
*G06T 7/246* (2017.01)
*G06K 9/62* (2022.01)
*G06N 20/00* (2019.01)
*G06V 20/40* (2022.01)
*G06V 40/10* (2022.01)
*G06N 3/08* (2006.01)

(52) U.S. Cl.
CPC ............ *G11B 27/02* (2013.01); *G06K 9/6215* (2013.01); *G06N 20/00* (2019.01); *G06T 7/248* (2017.01); *G06V 20/41* (2022.01); *G06V 20/46* (2022.01); *G06V 40/10* (2022.01); *G06N 3/08* (2013.01); *G06T 2207/10016* (2013.01)

(58) Field of Classification Search
CPC .................................. G11B 27/02; G06T 7/248
See application file for complete search history.

(56) References Cited

U.S. PATENT DOCUMENTS

| | | | | |
|---|---|---|---|---|
| 2014/0192212 | A1* | 7/2014 | He | G03B 17/17 |
| | | | | 399/296 |
| 2014/0341427 | A1* | 11/2014 | Kawano | G06V 20/52 |
| | | | | 382/103 |
| 2016/0188715 | A1* | 6/2016 | Chen | G06F 16/73 |
| | | | | 707/722 |
| 2016/0328856 | A1* | 11/2016 | Mannino | G06T 7/73 |
| 2017/0256288 | A1* | 9/2017 | Ai | H04N 5/2628 |
| 2018/0260665 | A1* | 9/2018 | Zhang | G06V 20/66 |
| 2019/0005313 | A1* | 1/2019 | Vemulapalli | G06V 40/174 |
| 2019/0304157 | A1* | 10/2019 | Amer | G06V 20/41 |

* cited by examiner

*Primary Examiner* — Yi Yang
(74) *Attorney, Agent, or Firm* — BakerHostetler

(57) ABSTRACT

Embodiments of the present disclosure describes techniques for clipping a video. The disclosed techniques comprise obtaining a video including a plurality of frames performing object detection on each frame; identifying objects contained in each frame, wherein a region where each object is located is selected through a detection box; classifying and recognizing the objects identified in each frame using a pre-trained classification model; selecting human body region images; determining a similarity between each human body region image selected from the plurality of frames and a target character image; in response to determining that a similarity between a human body region image and the target character image is greater than a predetermined threshold, identifying the human body region image as a clipping image; and synthesizing clipping images identified in the plurality of frames in order of time to obtain a clipping video.

17 Claims, 8 Drawing Sheets

METHOD AND SYSTEM OF CLIPPING A VIDEO, COMPUTING DEVICE, AND COMPUTER STORAGE MEDIUM

CROSS-REFERENCE TO RELATED APPLICATION

The present invention claims priority of Chinese patent application No. 201911033267.X, filed on Oct. 28, 2019. The entire disclosure of the above-identified application is hereby incorporated by reference herein and made a part of this specification.

BACKGROUND

In recent years, with the rapid development of various we media business, there are more and more we media videos, thus many video clipping applications have emerged, these video clipping applications are to cut, superimpose, and splice video clips or images to form a new video (such as short videos, video highlights, etc.).

SUMMARY

In view of this, the purpose of the embodiments of the present invention is to provide a method and a system of clipping a video, a computing device, and a computer storage medium to solve the problem that the existing vertical video clipping relies heavily on manual labor.

In order to achieve the above purpose, the embodiment of the invention provides a method of clipping a video, comprising:

obtaining a video to be processed, and performing object detection on each frame in the video to be processed, to obtain all objects contained in each frame, wherein a region where each object is located is selected through a detection box;

classifying and recognizing all the objects selected using a pre-trained classification model, to select human body region images from all the objects;

calculating a similarity between each human body region image selected from each frame and a target character image to be clipped;

taking a human body region image of each human body region image in each frame as a clipping image, wherein a similarity between the human body region image and the target character image is greater than a preset threshold;

synthesizing the clipping image of each frame in time order to obtain a clipping video.

Further, the step of the performing object detection on each frame in the video to be processed, to obtain all objects contained in each frame, comprise:

performing the object detection on each frame in the video to be processed using a pre-trained object detection model, to obtain all the objects contained in each frame.

Further, training steps of the classification model comprise:

taking a sample character image as a reference object to classify images to be processed;

taking images to be processed with the same category as the sample character image as positive sample data, and taking images to be processed with a different category from the sample character image as negative sample data;

adjusting an inter-class distance between the positive sample data and the negative sample data according to Triplet loss to enlarge a gap between the positive sample data and the negative sample data.

Further, the step of the calculating a similarity between each human body region image selected from each frame and a target character image to be clipped, comprises:

extracting multiple first feature vectors of the human body region images in each frame to obtain an n-dimensional first feature vector;

extracting multiple second feature vectors of the target character image to obtain an m-dimensional second feature vector, wherein, $n \leq m$, and both n and m are positive integers;

calculating a Euclidean distance between the first feature vector and the second feature vector, and the Euclidean distance is the similarity.

Further, the step of the taking a human body region image of each human body region image in each frame as a clipping image, wherein a similarity between the human body region image and the target character image is greater than a preset threshold, comprises:

setting a clipping box according to the detection box corresponding to the human body region image, wherein the clipping box includes the human body region image and the similarity corresponding to the human body region image;

identifying the clipping box and corresponding similarity in each frame of the video to be processed, and selecting the human body region image whose similarity is greater than the preset threshold in the clipping box as the clipping image.

Further, the step of the setting a clipping box according to the detection box corresponding to the human body region image, comprises:

obtaining a moving speed of the detection box corresponding to the human body region image, and selecting an average speed of the detection box corresponding to the human body region image in a unit frame as the moving speed of the detection box corresponding to the human body region image;

taking the moving speed of the detection box corresponding to the human body region image as a moving speed of the clipping box.

Further, the steps of the obtaining a moving speed of the detection box corresponding to the human body region image, and selecting an average speed of the detection box corresponding to the human body region image in a unit frame as the moving speed of the detection box corresponding to the human body region image, comprise:

anchoring center points of the detection box corresponding to the human body region image, and determining whether a distance between the center points of the detection box corresponding to the human body region image of adjacent frames is greater than a preset distance value:

taking the average speed of the detection box corresponding to the human body region image in the unit frame as the moving speed of the detection box corresponding to the human body region image, when the distance between the center points of the detection box corresponding to the human body region image of adjacent frames is greater than the preset distance value.

In order to achieve the above purpose, the present invention also provides a system of clipping a video, comprising:

a detecting module, obtaining a video to be processed, and performing object detection on each frame in the video to be processed, to obtain all objects contained in each frame, wherein a region where each object is located is marked through a detection box;

a classifying module, classifying and recognizing all the objects selected using a pre-trained classification model, to select human body region images from all the objects;

a calculating module, calculating a similarity between each human body region image selected from each frame and a target character image to be clipped;

a selecting module, taking a human body region image of each human body region image in each frame as a clipping image, wherein a similarity between the human body region image and the target character image is greater than a preset threshold;

a synthesizing module, synthesizing the clipping image in time order to obtain a clipping video.

In order to achieve the above purpose, the present invention also provides a computing device, which comprises a memory and a processor, the memory stores a system of clipping a video that can operable on the processor, when the system of clipping a video is executed by the processor for implementing steps of the method of clipping a video described above.

In order to achieve the above purpose, the present invention also provides a computer-readable storage medium, which stores computer programs, and the computer programs can be executed by at least one processor, thus the at least one processor implements the method of clipping a video described above.

The method and system of clipping a video, computing device, and computer storage medium provided by the embodiment of the present invention, all human bodies in each frame are identified through object detection of a video to be processed, similarities between all the human bodies and the target character image in each frame are calculated, and finally, clipping images whose similarity is greater than a preset threshold are synthesized in time order to obtain a clipping video of the target character. The present embodiment can perform video clipping for a specific character automatically in a single or a multi character scene according to the target character image to be clipped, which avoids low efficiency and high cost caused by manual clipping.

DETAILED DESCRIPTION OF ILLUSTRATIVE EMBODIMENTS

To make the objectives, technical solutions and advantages of the present invention more comprehensible, the present invention is described in further detail below with reference to embodiments and the accompanying drawings. It should be understood that the specific embodiments described herein are merely used for explaining the present invention, and are not intended to limit the present invention. All other embodiments obtained by those skilled in the art based on the embodiments of the present invention without creative efforts shall fall within the protection scope of the present invention.

The inventor of the patent application found that the existing method of clipping a videos have limited functions, which can only realize simple functions such as cutting, stacking, splicing, etc., for video clipping with special functions (such as the clipping of horizontal version material to vertical version video), it still relies heavily on manual labor, with low efficiency and high cost. The beneficial effect of the present invention is that the target character in the video to be processed can be clipped accurately, and a video can be synthesized.

Figure 1:
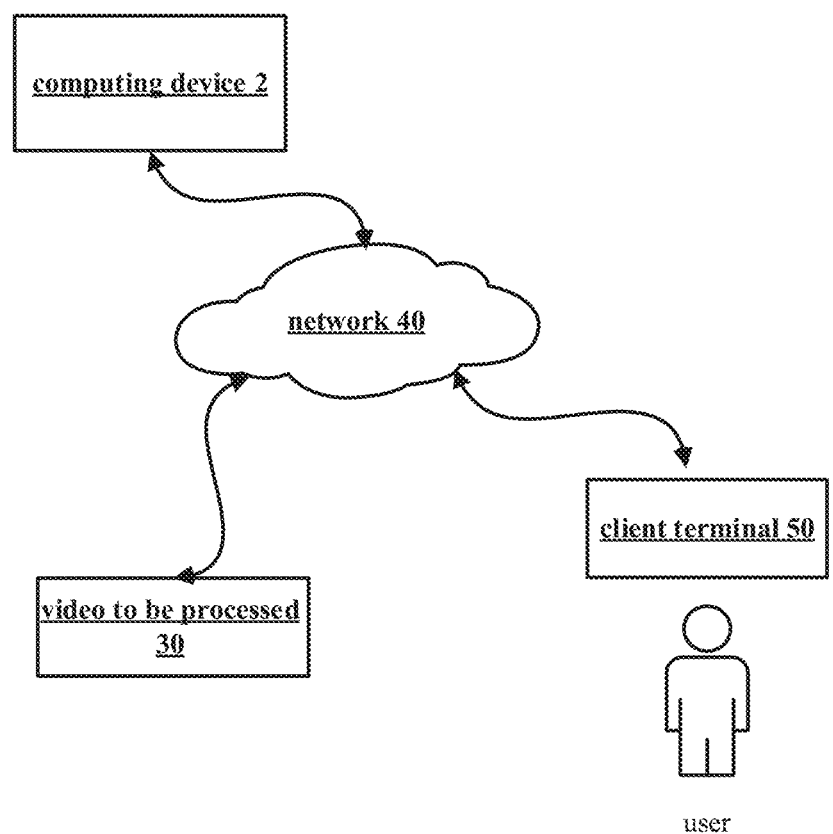
FIG. 1 schematically illustrates a schematic diagram of an environmental application according to an embodiment of the present application.

FIG. 1 schematically illustrates an environmental application diagram in accordance with the embodiment of the present application. In an exemplary embodiment, a computing device 2 may obtain a video 30 to be processed through one or more networks 40, and the computing device 2 may also connect multiple client terminals 50 through one or more networks 40.

The multiple client terminals 50 can be configured to access content and services of the computing device 2. The multiple client terminals 50 may include computing devices capable of executing a method of clipping a video, such as mobile devices, tablet devices, laptop computer machines, etc. The multiple client terminals 50 can be associated with one or more users. Each user may use a client terminal 50 to access the computing device 2, and each user may use the client terminal 50 to access the computing device 2 to obtain the video 30 to be processed. The multiple client terminals 50 can use different networks 40 to access the computing device 2. The computing device 2 processes any instructions entered by a user through the client terminal 50, it is not difficult to understand that the computing device 2 can be used to perform any of the aspects described in this article.

Exemplarily, the client terminal 50 may output (for example, display or present) processed (video clipping) contents to the user.

First Embodiment

Figure 2:
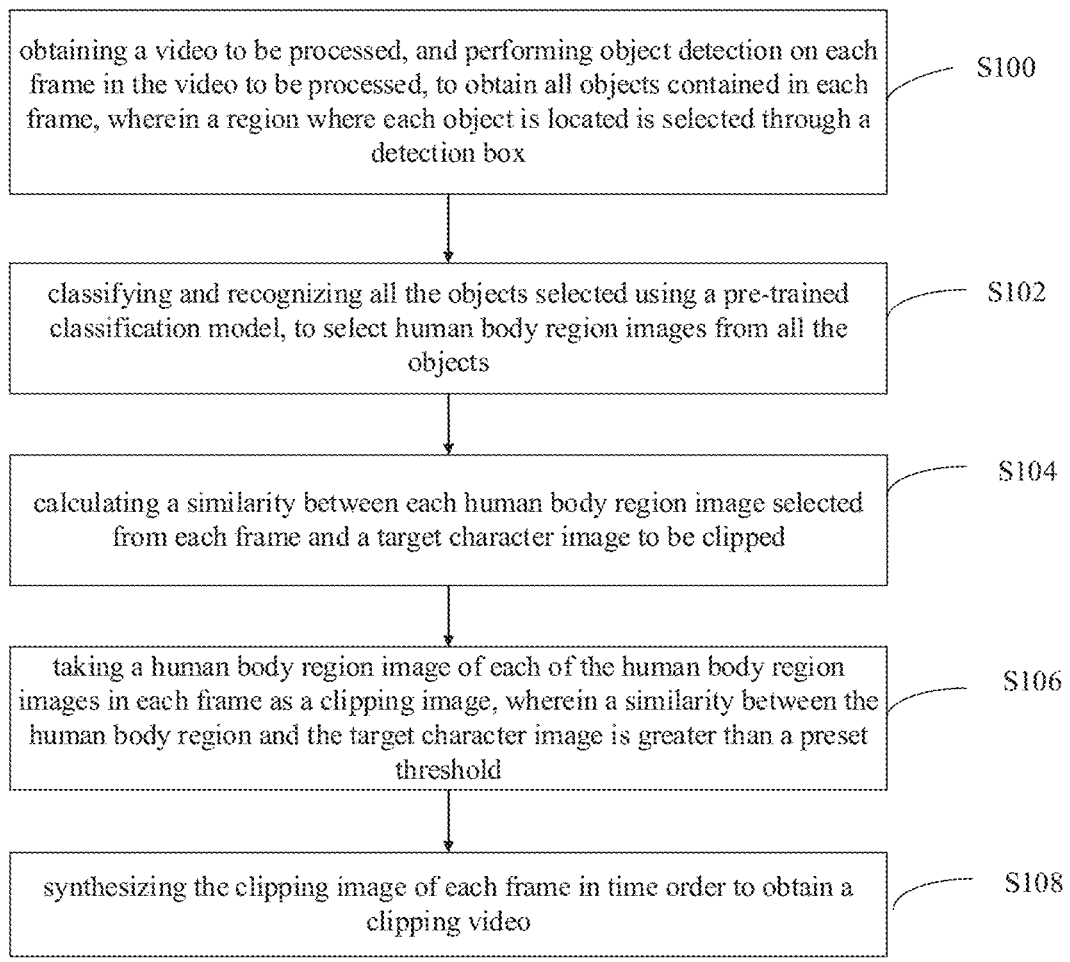
FIG. 2 is a flowchart of a first embodiment of the method of clipping a video of the present invention.

Referring to FIG. 2, a flowchart of steps of a method of clipping a video is shown. It can be understood that the flowchart in the embodiment of the method is not used to limit the order of execution of the steps. The following is an exemplary description with the computing device 2 as the execution subject. Details are as follows.

Step S100, obtaining a video to be processed, and performing object detection on each frame in the video to be processed, to obtain all objects contained in each frame wherein a region where each object is located is selected through a detection box.

Specifically, the user can upload or download the video to be processed to the computing device 2, so that the computing device 2 can obtain the video to be processed. Then, the computing device 2 performs object detection, and identifies all the objects in each frame of the video to be processed, and the detection box is used to mark the region where each object is located.

More specifically, the detection box can identify and mark the region where each object is located, and the detection box can mark each object, which can provide reference for subsequent human body region clipping, so that the human body can be clipped more accurately and better clipping effect can be achieved.

It should be noted that an object detection algorithm in the embodiment can be a detecting method of Haar+AdaBoost (HAL feature+classifier) for object detection, or it can be a detection algorithm based on Deep Learning technology, such as Fast R-CNN (Fast Region detection based Convolution Network algorithm) and Faster R-CNN (high-speed Region detection based Convolution Network algorithm) are used to detect objects.

Exemplarily, the step S100 further includes:

performing the object detection on each frame in the video to be processed using a pre-trained object detection model, to obtain all the objects contained in each frame.

Specifically, the object detection model in the embodiment is obtained by training based on Deep Learning technology, such as an object detection model trained based on the Fast R-CNN (Fast Region detection based Convolution Network) model, or an object detection model trained based on R-CNN (Region detection based Convolution Network) model.

After the object detection model is trained, frames to be recognized are input into the object detection model, and the frames of all the objects selected through the detection box can be output by the object detection model.

Step S102, classifying and recognizing all the objects selected using a pre-trained classification model, to select human body region images from all the objects.

Specifically, contents selected through the detection box include objects and human bodies, each frame selected through the detection box is identified by the pre-trained classification model, if a human body is identified, a human body region of the human body is retained to realize the removal of object content.

Figure 3:
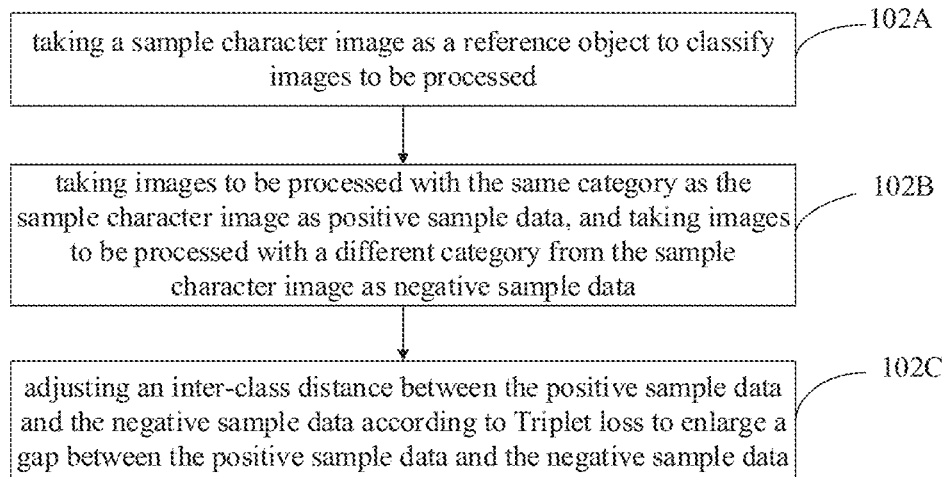
FIG. 3 is a flowchart of training steps of the classification model described in the FIG. 1 of the embodiment of the present invention.

Exemplarily, referring to FIG. 3, training steps of the classification model include:

Step S102A, taking a sample character image as a reference object to classify images to be processed.

Specifically, a large number of sample videos are obtained, and the sample videos are the videos containing sample character images; the sample character images refer to images containing the characters to be detected, which can be cartoon characters. During selecting the sample character images, in order to speed up the running speed, the sample character images can be intercepted in the sample videos, and the sample character images in each sample video are taken as reference objects to classify the images to be processed.

Step S102B, taking images to be processed with the same category as the sample character image as positive sample data, and taking images to be processed with a different category from the sample character image as negative sample data.

Specifically, the sample character image is a human body region image, and an image to be processed with the same category as the sample character image refers to an image that contains the body region, and an image to be processed with a different category from the sample character image refers to other object image that does not contain the human body.

Step S102C, adjusting an inter-class distance between the positive sample data and the negative sample data according to Triplet loss to enlarge a gap between the positive sample data and the negative sample data.

Specifically, the Triplet Loss function is used to further narrow an intra-class gap. Taking an x as a sample character image, an x1 belongs to the same category as the x, and an x2 belongs to a different category from the x.

In order to standardize the classification model, an adaptive threshold setting strategy is adopted, a threshold value is set as difference between an average distance of the same category and an average distance of different categories, further, difference between the positive sample data and the negative sample data is adjusted, constraints on sample data are as follows:

$$x=x1, x \neq x2:$$

a loss function is used to train until the final result is less than a preset value, and the classification algorithm of the corresponding sample character image is obtained.

Step S104, calculating a similarity between each human body region image selected from each frame and a target character image to be clipped.

Figure 10:
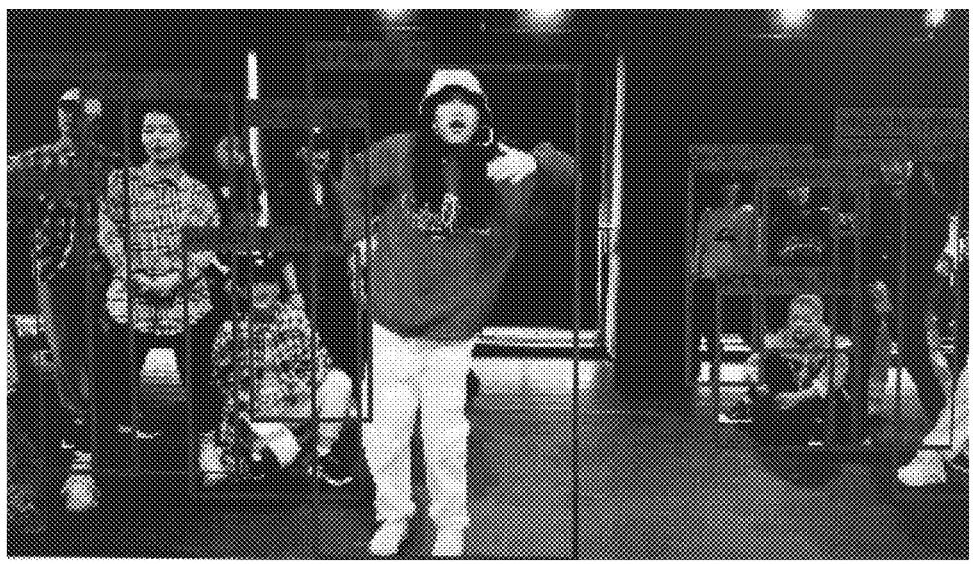
FIG. 10 is a schematic diagram of a clipping box of an embodiment of the present invention.
Figure 11:
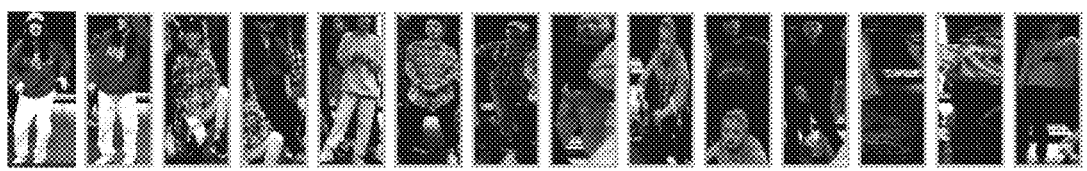
FIG. 11 is a schematic diagram of similarity ranking of an embodiment of the present invention.
Figure 11:
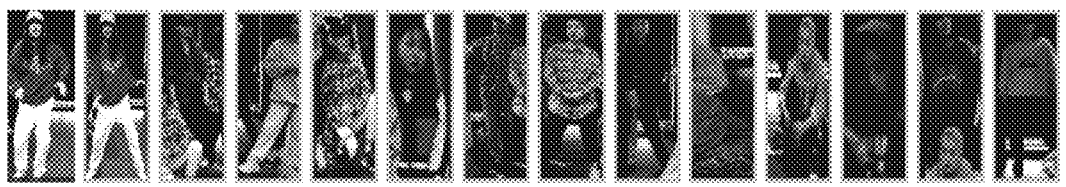

Specifically, a feature extraction is performed on the human body region image of each frame, a feature extraction is performed on the target character image to be clipped, and a similarity between the two features is calculated. As shown in FIG. 10, the similarity between the human body region image and the target character image is displayed, in order to facilitate viewing, the human body region images can also be sorted according to the similarity degree as shown in FIG. 11.

Figure 4:
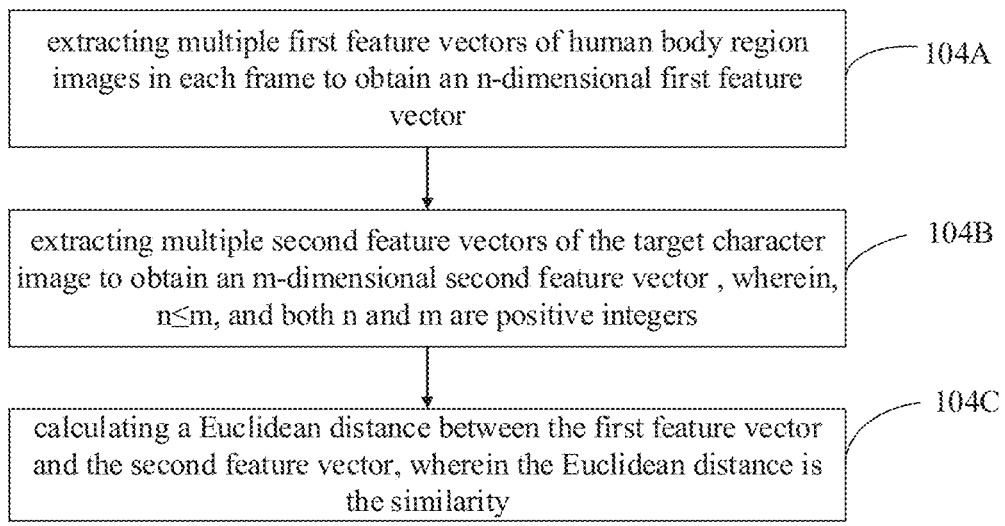
FIG. 4 is a flowchart of step S104 in the FIG. 2 according to an embodiment of the present invention.

Exemplarily, referring to FIG. 4, the step S104 further includes:

Step S104A, extracting multiple first feature vectors of human body region images in each frame to obtain an n-dimensional first feature vector.

Specifically, features in each human body region image are vectorized to obtain the first feature vectors, and each feature vector is combined to obtain a first feature matrix. The extracted features are not limited to the face size, eye spacing, mouth feature, hair feature, clothing, etc. of a character image in each human body region image, each feature corresponds to a first feature vector of one dimension.

Step S104B, extracting multiple second feature vectors of the target character image to obtain an m-dimensional second feature vector, wherein, $n \leq m$, and both n and m are positive integers.

Specifically, features in the target character image are vectorized to obtain the second feature vector, and each feature vector is combined to obtain the second feature matrix. The extracted features are not limited to the face size, eye spacing, mouth features, hair features, clothing, etc. of the target character image, each feature corresponds to a second feature vector of one dimension. Since the target character is moving in the video, the extracted features may be incomplete, that is the extracted features $n \leq m$.

Step S104C, calculating a Euclidean distance between the first feature vector and the second feature vector, wherein the Euclidean distance is the similarity.

Specifically, local feature for local feature extraction, first, the image features are extracted line by line in the horizontal direction, and then a 1×1 convolution operation is performed. Thus the feature obtained represents a horizontal part of the image of the human body region. During the learning of the local feature, an alignment operation is performed by calculating the shortest path.

F and G are the local features of the two images of the human body region image and the target character image respectively, and a calculation formula of each distance matrix D:

$$D=|Fi-Gi|-|Fj-Gj|;$$

wherein, D is a distance between the i-th feature of the human body region image and the j-th feature of the target character image, a local distance between two images is defined as the total distance of the shortest path from (1, 1) to (H, H), and then the shortest path Dmin is calculated; the greater the D is, the greater the similarity is.

Step S106, taking a human body region image of each of the human body region images in each frame as a clipping image, wherein a similarity between the human body region and the target character image is greater than a preset threshold.

Specifically, the preset threshold can filter the human body region image which is not similar to the target character image, especially when a target character is not existed in the frame.

Figure 5:
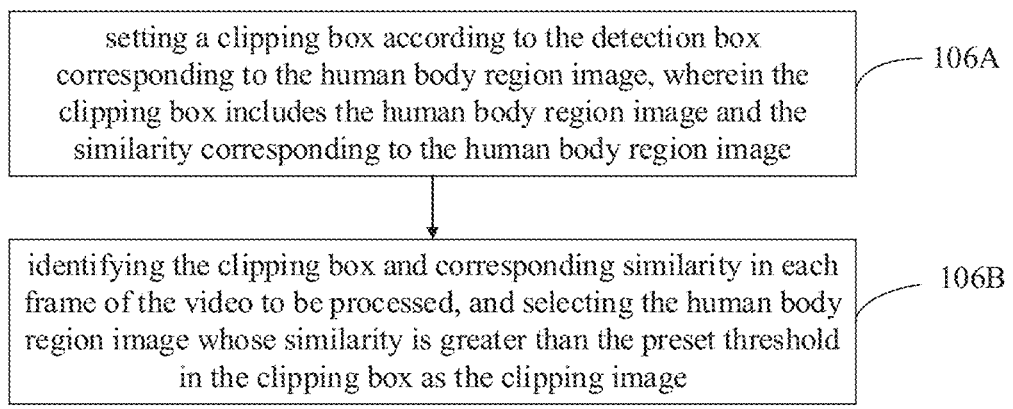
FIG. 5 is a flowchart of step S106 in the FIG. 2 according to an embodiment of the present invention.

Exemplarily, referring to FIG. 5, the step S106 further includes:

Step S106A, setting a clipping box according to the detection box corresponding to the human body region image, wherein the clipping box includes the human body region image and the similarity corresponding to the human body region image.

Specifically, the clipping box is used to select the human body region image in each frame, and display the similarity of the human body region image, as shown in FIG. 10.

Step S106B, identifying the clipping box and corresponding similarity in each frame of the video to be processed, and selecting the human body region image whose similarity is greater than the preset threshold in the clipping box as the clipping image.

Figure 12:
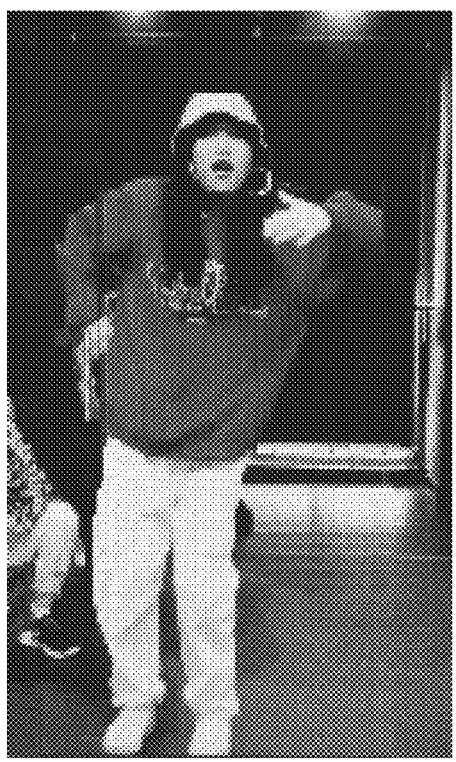
FIG. 12 is a schematic diagram of a clipping image of an embodiment of the present invention.

Specifically, the similarity marked on the clipping box is filtered, and the image of human body region whose similarity is greater than the preset threshold in each frame of the video to be processed is taken as the clipping image, wherein, the preset threshold is set in advance, for example, it is set to 99%, when the similarity is greater than or equal to 99%, the image of the human body region is taken as the clipping image. When the clipping box is set, it can be set according to the detection box to adapt the clipping image to the human body region image, that is, characters are picked out, and the background can be pasted later to realize a normal viewing of the video. The clipping box can also be fixed in size to clip out part of the background, so as to realize the direct viewing of the video after the clip. For example, the clipping image is shown in FIG. 12.

Figure 6:
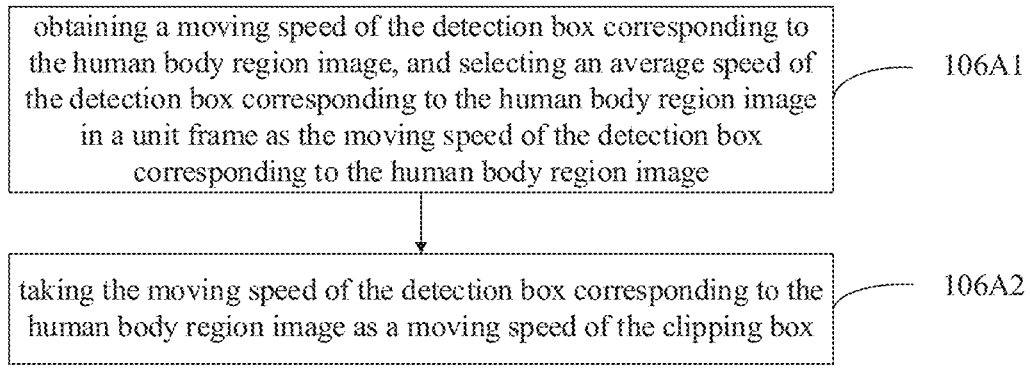
FIG. 6 is a flowchart of step S106A in FIG. 5 according to an embodiment of the present invention.

Exemplarily, referring to FIG. 6, the step S106A further includes:

Step S106A1, obtaining a moving speed of the detection box corresponding to the human body region image, and selecting an average speed of the detection box corresponding to the human body region image in a unit frame as the moving speed of the detection box corresponding to the human body region image.

Specifically, in order to prevent the clipped video from shaking, the unit frame can be customized, such as 3 frames, 5 frames, and so on.

Step S106A2, taking the moving speed of the detection box corresponding to the human body region image as a moving speed of the clipping box.

Specifically, if the moving speed of the clipping box is consistent with the moving speed of the detection box corresponding to the image of the human body region, the clipping video will shake; but if the moving speed of the clipping box is too slow, the target character will appear outside the clipping box; therefore, it is necessary to adjust parameters to adjust a suitable speed value to strike a balance between the two. The average speed of the detection box corresponding to the human body region image of the unit frame (for example, 5 frames) image is taken as the moving speed of the clipping box.

Figure 7:
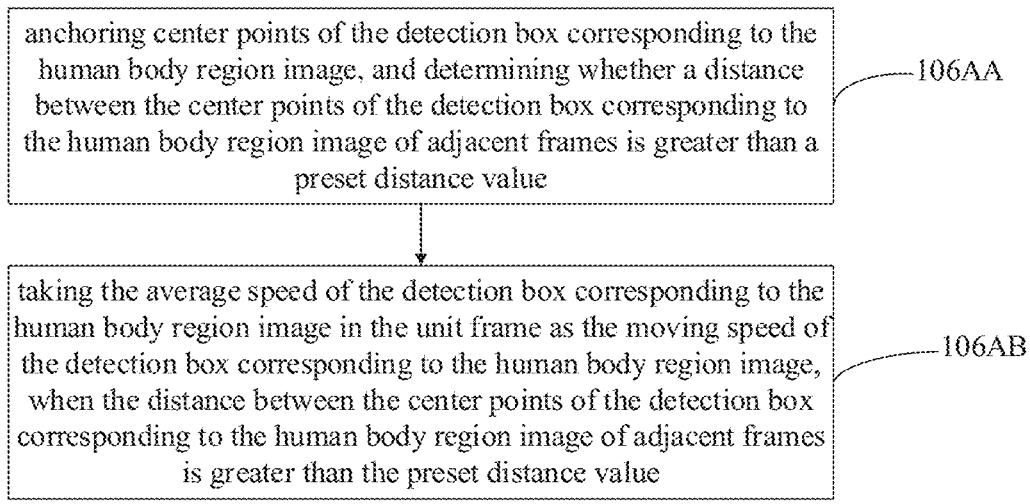
FIG. 7 is a flowchart of step S106A1 in FIG. 6 according to an embodiment of the present invention.

Exemplarily, referring to FIG. 7, the step S106A1 further includes:

Step S106AA, anchoring center points of the detection box corresponding to the human body region image, and determining whether a distance between the center points of the detection box corresponding to the human body region image of adjacent frames is greater than a preset distance value.

Specifically, the center points of the detection box corresponding to all the human body region images are anchored, and the center point of the detection box corresponding to the human body region image of the first frame can be taken as the starting point, and whether the distance between the center points of the detection boxes corresponding to the human body region images of the adjacent frames are greater than the preset distance value is sequentially determined. The detection boxes corresponding to the human body region images of all frames are detected, and movement rates of the detection boxes corresponding to the subsequent human body region images are well adjusted.

Step S106AB, taking the average speed of the detection box corresponding to the human body region image in the unit frame as the moving speed of the detection box corresponding to the human body region image, when the distance between the center points of the detection box corresponding to the human body region image of adjacent frames is greater than the preset distance value.

Specifically, the number of detection boxes corresponding to the human body region images larger than the preset distance value is counted, and if the number is too large, the average speed of the detection box corresponding to the human body region image of the unit frame is taken as the moving speed of the detection box corresponding to the human body region image, so that the clipping image selected by the clipping box is clear. The unit frame can be set in advance, and if the difference between the distance between the center points of the detection box corresponding to the human body region image of the adjacent frames and the preset distance value is too large, the value of the unit frame is increased accordingly, and vice versa.

Step S108, synthesizing the clipping image of each frame in time order to obtain a clipping video.

Specifically, the clipping image is synthesized according to the time order, and the video synthesis technology is used to synthesize the clipping video. The clipping video can be rendered accordingly to obtain a desired video effect.

Second Embodiment

Figure 8:
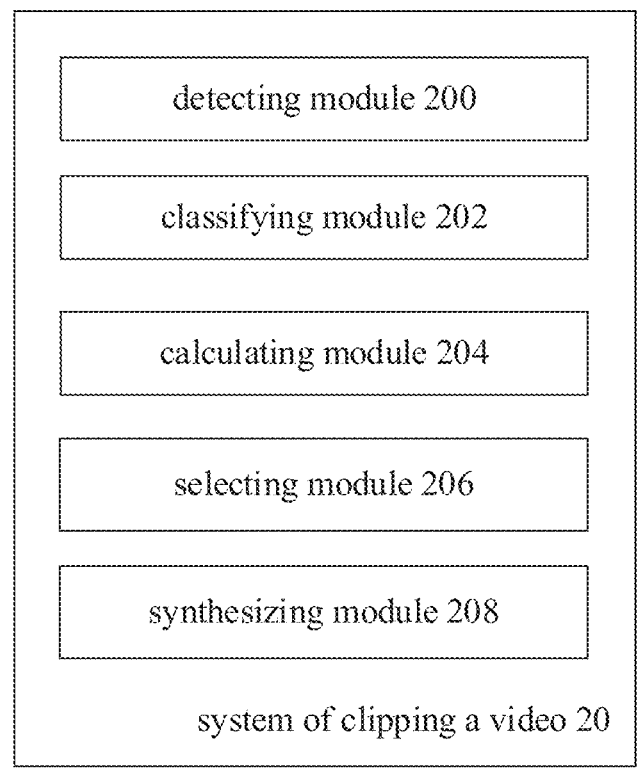
FIG. 8 is a schematic diagram of program modules of a second embodiment of the system of clipping a video of the present invention.

Please continue to refer to FIG. 8, which shows a schematic diagram of program modules of a second embodiment of the system of clipping a video of the present invention. In the embodiment, the system of clipping a video 20 may include or be divided into one or more program modules, and the one or more program modules are stored in a storage medium and executed by one or more processors to complete the invention, which can realize the above-mentioned method of clipping a video. The program modules referred to in the embodiment of the present invention refer to a series of computer program instruction segments capable of accomplishing specific functions, and is more suitable for describing execution process of the system of clipping a video 20 in the storage medium than the program itself. The following description will specifically describe the functions of the program modules of the embodiment:

A detecting module 200, obtaining a video to be processed, and performing object detection on each frame in the video to be processed, to obtain all objects contained in each frame, wherein a region where each object is located is selected through a detection box.

Specifically, the user can upload or download the video to be processed to the computing device 2, so that the computing device 2 can obtain the video to be processed. Then, the computing device 2 performs object detection, and identifies all the objects in each frame of the video to be processed, and the detection box is used to mark the region where each object is located.

More specifically, the detection box can identify and mark the region where each object is located, and the detection box can mark each object, which can provide reference for subsequent human body region clipping, so that the human body can be clipped more accurately and better clipping effect can be achieved.

It should be noted that an object detection algorithm in the embodiment can be a detecting method of Haar+AdaBoost (HAL feature+classifier) for object detection, or it can be a detection algorithm based on Deep Learning technology, such as Fast R-CNN (Fast Region detection based Convolution Network algorithm) and Faster R-CNN (high-speed Region detection based Convolution Network algorithm) are used to detect objects.

Exemplarily, the detecting module 200 is further used for:

performing the object detection on each frame in the video to be processed using a pre-trained object detection model, to obtain all the objects contained in each frame.

Specifically, the object detection model in the embodiment is obtained by training based on Deep Learning technology, such as an object detection model trained based on the Fast R-CNN (Fast Region detection based Convolution Network) model, or an object detection model trained based on R-CNN (Region detection based Convolution Network) model.

After the object detection model is trained, frames to be recognized are input into the object detection model, and the frames of all the objects selected through the detection box can be output by the object detection model.

A classifying module 202, classifying and recognizing all the objects selected using a pre-trained classification model, to select human body region images from all the objects.

Specifically, contents selected through the detection box include objects and human bodies, each frame selected through the detection box is identified by the pre-trained classification model, if a human body is identified, a human body region of the human body is retained to realize the removal of object content.

Exemplarily, the classifying module 202 is further used for training classification algorithm:

taking a sample character image as a reference object to classify images to be processed.

Specifically, a large number of sample videos are obtained, and the sample videos are the videos containing sample character images; the sample character images refer to images containing the characters to be detected, which can be cartoon characters. During selecting the sample character images, in order to speed up the running speed, the sample character images can be intercepted in the sample videos, and the sample character images in each sample video are taken as reference objects to classify the images to be processed.

Taking images to be processed with the same category as the sample character image as positive sample data, and taking images to be processed with a different category from the sample character image as negative sample data.

Specifically, the sample character image is a human body region image, and an image to be processed with the same category as the sample character image refers to an image that contains the body region, and an image to be processed with a different category from the sample character image refers to other object image that does not contain the human body.

An inter-class distance between the positive sample data and the negative sample data according to Triplet loss is adjusted to enlarge a gap between the positive sample data and the negative sample data.

Specifically, the Triplet Loss function is used to further narrow an intra-class gap. Taking an x as a sample character image, an x1 belongs to the same category as the x, and an x2 belongs to a different category from the x.

In order to standardize the classification model, an adaptive threshold setting strategy is adopted, a threshold value is set as difference between an average distance of the same category and an average distance of different categories, further, difference between the positive sample data and the negative sample data is adjusted, constraints on sample data are as follows:

$$x=x1, x \neq x2;$$

a loss function is used to train until the final result is less than a preset value, and the classification algorithm of the corresponding sample character image is obtained.

A calculating module 204, calculating a similarity between each human body region image selected from each frame and a target character image to be clipped.

Specifically, a feature extraction is performed on the human body region image of each frame, a feature extraction is performed on the target character image to be clipped, and similarity between the two features is calculated. As shown in FIG. 10, the similarity between the human body region image and the target character image is displayed, in order to facilitate viewing, the human body region images can also be sorted according to the similarity degree as shown in FIG. 11.

Exemplarily, the calculating module 204 is further used for:

extracting multiple first feature vectors of human body region images in each frame to obtain an n-dimensional first feature vector.

Specifically, features in each human body region image are vectorized to obtain the first feature vectors, and each feature vector is combined to obtain a first feature matrix. The extracted features are not limited to the face size, eye spacing, mouth feature, hair feature, clothing, etc. of a character image in each human body region image, each feature corresponds to a first feature vector of one dimension.

Extracting multiple second feature vectors of the target character image to obtain an m-dimensional second feature vector, wherein, n≤m, and both n and m are positive integers.

Specifically, features in the target character image are vectorized to obtain the second feature vector, and each feature vector is combined to obtain the second feature matrix. The extracted features are not limited to the face size, eye spacing, mouth features, hair features, clothing, etc. of the target character image, each feature corresponds to a second feature vector of one dimension. Since the target character is moving in the video, the extracted features may be incomplete, that is the extracted features n≤m.

Calculating a Euclidean distance between the first feature vector and the second feature vector, wherein the Euclidean distance is the similarity.

Specifically, local feature for local feature extraction, first, the image features are extracted line by line in the horizontal direction, and then a 1×1 convolution operation is performed. Thus the feature obtained represents a horizontal part of the image of the human body region. During the learning of the local feature, an alignment operation is performed by calculating the shortest path.

F and G are the local features of the two images of the human body region image and the target character image respectively, and a calculation formula of each distance matrix D:

$$D=|Fi-Gi|-|Fj-Gj|;$$

wherein, D is a distance between the i-th feature of the human body region image and the j-th feature of the target character image, a local distance between two images is defined as the total distance of the shortest path from (1, 1) to (H, H), and then the shortest path Dmin is calculated; the greater the D is, the greater the similarity is.

A selecting module 206, taking a human body region image of each of the human body region images in each frame as a clipping image, wherein a similarity between the human body region and the target character image is greater than a preset threshold.

Specifically, the preset threshold can filter the human body region image which is not similar to the target character image, especially when a target character is not existed in the frame.

Exemplarily, the selecting module 206 is further used for:

Setting a clipping box according to the detection box corresponding to the human body region image, wherein the clipping box includes the human body region image and the similarity corresponding to the human body region image.

Specifically, the clipping box is used to select the human body region image in each frame, and display the similarity of the human body region image, as shown in FIG. 10.

Identifying the clipping box and corresponding similarity in each frame of the video to be processed, and selecting the human body region image whose a similarity is greater than the preset threshold in the clipping box as the clipping image.

Specifically, the similarity marked on the clipping box is filtered, and the image of human body region whose similarity is greater than the preset threshold in each frame of the video to be processed is taken as the clipping image, wherein, the preset threshold is set in advance, for example, it is set to 99%, when the similarity is greater than or equal to 99%, the image of the human body region is taken as the clipping image. When the clipping box is set, it can be set according to the detection box to adapt the clipping image to the human body region image, that is, characters are picked out, and the background can be pasted later to realize a normal viewing of the video. The clipping box can also be fixed in size to clip out part of the background, so as to realize the direct viewing of the video after the clip. For example, the clipping image is shown in FIG. 12.

Exemplarily, the selecting module 206 is further used for:

obtaining a moving speed of the detection box corresponding to the human body region image, and selecting an average speed of the detection box corresponding to the human body region image in a unit frame as the moving speed of the detection box corresponding to the human body region image.

Specifically, in order to prevent the clipped video from shaking, the unit frame can be customized, such as 3 frames, 5 frames, and so on.

The moving speed of the detection box corresponding to the human body region image is taken as a moving speed of the clipping box.

Specifically, if the moving speed of the clipping box is consistent with the moving speed of the detection box corresponding to the image of the human body region, the clipping video will shake, but if the moving speed of the clipping box is too slow, the target character will appear outside the clipping box, therefore, it is necessary to adjust parameters to adjust a suitable speed value to strike a balance between the two. The average speed of the detection box corresponding to the human body region image of the unit frame (for example, 5 frames) image is taken as the moving speed of the clipping box.

Exemplarily, the selecting module 206 is further used for:

anchoring center points of the detection box corresponding to the human body region image, and determining whether a distance between the center points of the detection box corresponding to the human body region image of adjacent frames is greater than a preset distance value.

Specifically, the center points of the detection box corresponding to all the human body region images are anchored, and the center point of the detection box corresponding to the human body region image of the first frame can be taken as the starting point, and whether the distance between the center points of the detection boxes corresponding to the human body region images of the adjacent frames are greater than the preset distance value is sequentially determined. The detection boxes corresponding to the human body region images of all frames are detected, and movement rates of the detection boxes corresponding to the subsequent human body region images are well adjusted.

Taking the average speed of the detection box corresponding to the human body region image in the unit frame as the moving speed of the detection box corresponding to the human body region image, when the distance between the center points of the detection box corresponding to the human body region image of adjacent frames is greater than the preset distance value.

Specifically, the number of detection boxes corresponding to the human body region images larger than the preset distance value is counted, and if the number is too large, the average speed of the detection box corresponding to the human body region image of the unit frame is taken as the moving speed of the detection box corresponding to the human body region image, so that the clipping image selected by the clipping box is clear. The unit frame can be set in advance, and if the difference between the distance between the center points of the detection box corresponding to the human body region image of the adjacent frames and the preset distance value is too large, the value of the unit frame is increased accordingly, and vice versa.

A synthesizing module 208, synthesizing the clipping image of each frame in time order to obtain a clipping video.

Specifically, the clipping image is synthesized according to the time order, and the video synthesis technology is used to synthesize the clipping video. The clipping video can be rendered accordingly to obtain a desired video effect.

Third Embodiment

Figure 9:
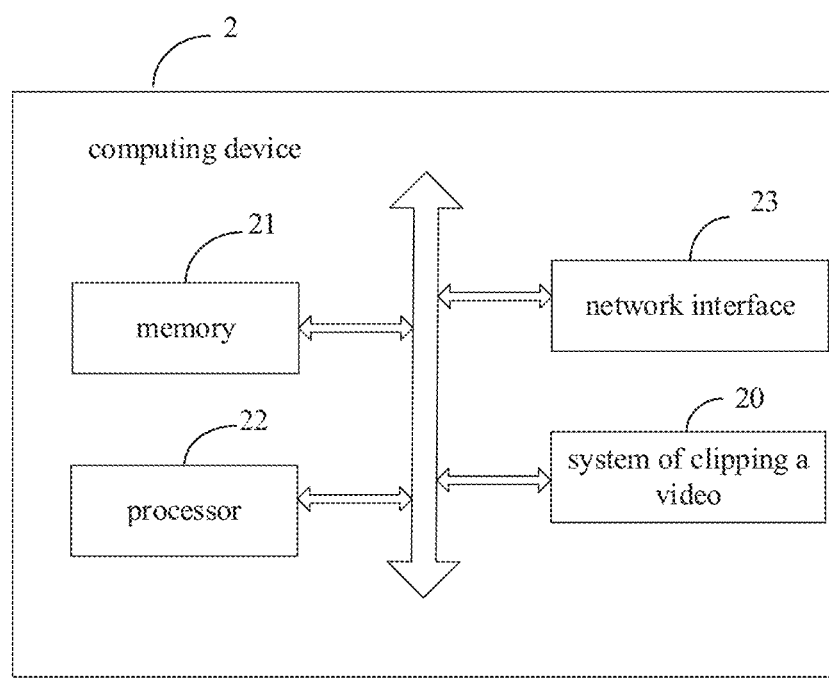
FIG. 9 is a schematic diagram of a hardware structure of a third embodiment of the computing device of the present invention.

Referring to FIG. 9, which is a schematic diagram of the hardware architecture of a computing device according to a third embodiment of the present invention. In the embodiment, the computing device 2 is a device that can automatically perform numerical calculation and/or information processing according to pre-set or stored instructions. The computer device 2 may be a rack server, a blade server, a tower server, or a cabinet server (including an independent server, or a server cluster composed of multiple servers). As shown in FIG. 9, the computing device 2 includes at least, but is not limited to, a memory 21, a processor 22, a network interface 23 and the system of clipping a video 20 that can communicate with each other through a system bus. Wherein:

In the embodiment, the memory 21 includes at least one type of computer-readable storage medium, and the readable storage medium includes a flash memory, a hard disk, a multimedia card, a card type memory (e.g., SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, etc. In some embodiments, the memory 21 may be an internal storage module of the computing device 2 such as a hard disk or memory of the computing device 2. In other embodiments, the memory 21 may also be an external storage device of the computing device 2, such as a plugged hard disk provided on the computing device 2, a smart media card (SMC), secure digital (SD) card, a flash memory card, and the like. Of course, the memory 21 may also include both an internal storage module and an external storage device of the computing device 2. In the embodiment, the memory 2 is generally used to store an operating system and various types of application software installed in the computing device 2 such as program codes of the system of clipping a video of the second embodiment and the like. In addition, the memory 21 may also be used to temporarily store various types of data that have been or will be outputted.

The processor 22, in some embodiments, may be a Central Processing Unit (CPU), a controller, a microcontroller, a microprocessor, or other data processing chip. The processor 22 is generally used to control the overall operation of the computing device 2. In the embodiment, the processor 22 is used to run the program codes or process data stored in the memory 21, for example, to run the system of clipping a video 20 to implement the method of clipping a video of the first embodiment.

The network interface 23 may include a wireless network interface or a wired network interface, and the network interface 23 is generally used to establish a communication connection between the server 2 and other electronic devices. For example, the network interface 23 is used to connect the server 2 with an external terminal through a network, and establish a data transmission channel and a communication connection between the server 2 and the external terminal. The network may be an intranet (intranet), the Internet (Internet), a global system of mobile communication (GSM), a wideband code division multiple access (WCDMA), 4G network, 5G Network, Bluetooth (Bluetooth), Wi-Fi and other wireless or wired networks. It should be pointed out that FIG. 9 only shows the computer device 2 with components 20-23, but it should be understood that it is not required to implement all the components shown, and more or fewer components may be implemented instead.

In the embodiment, the system of clipping a video 20 stored in the memory 21 can further be divided into one or more program modules, the one or more program modules are stored in the memory 21 and are executed by one or more processors (in the embodiment, it is the processor 22) to complete the present invention.

For example, FIG. 8 shows a schematic diagram of program modules for implementing the second embodiment of the system of clipping a video 20, in the embodiment, the system of clipping a video 20 can be divided into a detecting module 200, a classifying module 202, a calculating module 204, a selecting module 206 and a synthesizing module 208. Wherein, the program module referred in the present invention refers to a series of computer program instruction segments that can complete specific functions, and is more suitable than a program to describe the execution process of the system of clipping a video 20 in the computing device 2. The specific functions of the program modules 200-208 have been described in detail in the second embodiment, and will not be repeated here.

Fourth Embodiment

The embodiment also provides a computer-readable storage medium may be a flash memory, a hard disk, a multimedia card, a card type memory (e.g., SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, a server, an App store etc., which stores computer instructions that upon execution by a processor cause the processor to implement corresponding functions. The computer-readable storage medium of the embodiment is used to store the system of clipping a video 20, and when executed by a processor, the method of clipping a video of the first embodiment is implemented.

The method and system of clipping a video, computing device, and computer storage medium provided by the embodiment of the present invention, all human bodies in each frame are identified through object detection of a video to be processed, similarities between all the human bodies and the target character image in each frame are calculated, and finally, clipping images whose similarity is greater than a preset threshold are synthesized in time order to obtain a clipping video of the target character. The present embodiment can perform video clipping for a specific character in a multi character scene, and the recognition speed is fast, efficient, and time-saving and labor-saving.

The above-mentioned serial numbers of the embodiments of the present invention are merely for description, and do not represent the superiority or inferiority of the embodiments.

Through the description of the above embodiments, those skilled in the art can clearly understand that the methods in the above embodiments can be implemented by means of software plus a necessary general hardware platform, and of course, can also be implemented by hardware, but in many cases the former is better implementation.

The embodiments described above are just preferred embodiments of the present invention and thus do not limit the patent scope of the present invention. Any equivalent structure, or equivalent process transformation made according to the contents of the description and the drawings of the present invention or any direct or indirect application to other related arts shall be also included in the patent protection scope of the present invention.

What is claimed is:

1. A method of clipping a video, comprising:
    obtaining a video, the video comprising a plurality of frames;
    performing object detection on each of the plurality of frames;
    identifying objects contained in each of the plurality of frames, wherein a region where each object is located is selected through a detection box;
    classifying and recognizing the identified objects in each of the plurality of frames using a classification model, the classification model being pre-trained;
    selecting human body region images based on the classifying and recognizing the objects;
    determining a similarity between each of the human body region images selected from the plurality of frames and a target character image;
    in response to determining that a similarity between a human body region image among the human body region images and the target character image is greater than a predetermined threshold, identifying the human body region image as a clipping image, wherein the identifying the human body region image as a clipping image further comprises setting a clipping box based on a detection box corresponding to the human body region image, wherein the setting a clipping box based on a detection box corresponding to the human body region image further comprises determining a moving speed of the detection box, and wherein the determining a moving speed of the detection box further comprises:
        determining whether a distance between center points of the detection box in adjacent frames among the plurality of frames is greater than a predetermined distance value, and
        identifying an average speed of the detection box in a unit frame as the moving speed of the detection box in response to determining that the distance between the center points of the detection box in the adjacent frames is greater than the predetermined distance value; and
    synthesizing clipping images identified in the plurality of frames in order of time to obtain a clipping video.

2. The method of 1, further comprising:
    performing the object detection on each of the plurality of frames using a pre-trained object detection model to identify the objects contained in each of the plurality of frames.

3. The method of claim 1, wherein training the classification model comprises:
    classifying images to be processed using a sample character image as a reference object;
    identifying an image among the images with a same category as the sample character image as positive sample data, and identifying another image among the images with a different category from the sample character image as negative sample data; and
    adjusting an inter-class distance between the positive sample data and the negative sample data based on Triplet loss to enlarge a difference between the positive sample data and the negative sample data.

4. The method of claim 1, wherein the determining a similarity between each of the human body region images and a target character image further comprises:
    extracting multiple first feature vectors of each of the human body region images to obtain an n-dimensional first feature vector;
    extracting multiple second feature vectors of the target character image to obtain an m-dimensional second feature vector; wherein n≤m, and both n and m are positive integers; and
    determining a Euclidean distance between the first feature vector and the second feature vector, the Euclidean distance being indicative of the similarity between each of the human body region images and a target character image.

5. The method of claim 1, wherein the clipping box includes the human body region image and the similarity correspond to the human body region image, and wherein the identifying the human body region image as a clipping image in response to determining that a similarity between a human body region image and the target character image is greater than a predetermined threshold further comprises:
    identifying the clipping box including the human body region image and the corresponding similarity, and selecting the human body region image with the similarity being greater than the predetermined threshold in the clipping box as the clipping image.

6. The method of claim 5, wherein the setting a clipping box based on a detection box corresponding to the human body region image further comprises:
    identifying the moving speed of the detection box as a moving speed of the clipping box.

7. A system of clipping a video, comprising:
    at least one processor; and
    at least one memory communicatively coupled to the at least one processor and storing instructions that upon execution by the at least one processor cause the system to perform operations, the operations comprising:
    obtaining a video, the video comprising a plurality of frames;
    performing object detection on each of the plurality of frames;
    identifying objects contained in each of the plurality of frames, wherein a region where each object is selected through a detection box;
    classifying and recognizing the objects identified in each of the plurality of frames using a classification model, the classification model being pre-trained;
    selecting human body region images based on the classifying and recognizing the objects;
    determining a similarity between each of the human body region images selected from the plurality of frames and a target character image;
    in response to determining that a similarity between a human body region image among the human body region images and the target character image is greater than a predetermined threshold, identifying the human body region image as a clipping image, wherein the identifying the human body region image as a clipping image further comprises setting a clipping box based on a detection box corresponding to the human body region image, wherein the setting a clipping box based on a detection box corresponding to the human body region image further comprises determining a moving speed of the detection box, and wherein the determining a moving speed of the detection box further comprises:
  determining whether a distance between center points of the detection box in adjacent frames among the plurality of frames is greater than a predetermined distance value, and
  identifying an average speed of the detection box in a unit frame as the moving speed of the detection box in response to determining that the distance between the center points of the detection box in the adjacent frames is greater than the predetermined distance value; and
synthesizing clipping images identified in the plurality of frames in order of time to obtain a clipping video.

8. The system of claim 7, the operations further comprising:
  performing the object detection on each of the plurality of frames using a pre-trained object detection model to identify the objects contained in each of the plurality of frames.

9. The system of claim 7, wherein training the classification model comprises:
  classifying images to be processed using a sample character image as a reference object;
  identifying an image among the images with a same category as the sample character image as positive sample data, and identifying another image among the images with a different category from the sample character image as negative sample data: and adjusting an inter-class distance between the positive sample data and the negative sample data based on Triplet loss to enlarge a difference between the positive sample data and the negative sample data.

10. The system of claim 7, wherein the determining a similarity between each of the human body region images and a target character image further comprises:
  extracting multiple first feature vectors of each of the human body region images to obtain an n-dimensional first feature vector;
  extracting multiple second feature vectors of the target character image to obtain an m-dimensional second feature vector; wherein n≤m, and both n and m are positive integers;
  determining a Euclidean distance between the first feature vector and the second feature vector, the Euclidean distance being indicative of the similarity between each of the human body region images and a target character image.

11. The system of claim 7, wherein the clipping box includes the human body region image and the similarity correspond to the human body region image, and wherein the identifying the human body region image as a clipping image in response to determining that a similarity between a human body region image and the target character image is greater than a predetermined threshold further comprises:
  identifying the clipping box including the human body region image and the corresponding similarity, and selecting the human body region image with the similarity being greater than the predetermined threshold in the clipping box as the clipping image.

12. The system of claim 11, wherein the setting a clipping box based on a detection box corresponding to the human body region image further comprises:
  identifying the moving speed the detection box as a moving speed of the clipping box.

13. A non-transitory computer-readable storage medium, storing computer-readable instructions that upon execution by a processor cause the processor to implement operations comprising:
  obtaining a video, the video comprising a plurality of frames;
  performing object detection on each of the plurality of frames;
  identifying objects contained in each of the plurality of frames, wherein a region where each object is located is selected through a detection box;
  classifying and recognizing the objects identified in each of the plurality of frames using a classification model, the classification model pre-trained;
  selecting human body region images based on the classifying and recognizing the objects;
  determining a similarity between each of the human body region images selected from the plurality of frames and a target character image;
  in response to determining that a similarity between a human body region image among the human body region images and the target character image is greater than a predetermined threshold, identifying the human body region image as a clipping image, wherein the identifying the human body region image as a clipping image further comprises setting a clipping box based on a detection box corresponding to the human body region image, wherein the setting a clipping box based on a detection box corresponding to the human body region image further comprises
    determining a moving speed of the detection box, and wherein the determining a moving speed of the detection box further comprises:
    determining whether a distance between center points of the detection box in adjacent frames among the plurality of frames is greater than a predetermined distance value, and identifying an average speed of the detection box in a unit frame as the moving speed of the detection box in response to determining that the distance between the center points of the detection box in the adjacent frames is greater than the predetermined distance value; and
  synthesizing clipping images identified in the plurality of frames in order of time to obtain a clipping video.

14. The non-transitory computer-readable storage medium of claim 13, wherein training the classification model comprises:
  classifying images to be processed using a sample character image as a reference object;
  identifying an image among the images with a same category as the sample character image as positive sample data, and identifying another image among the images with a different category from the sample character image as negative sample data; and
  adjusting an inter-class distance between the positive sample data and the negative sample data based on Triplet loss to enlarge a difference between the positive sample data and the negative sample data.

15. The non-transitory computer-readable storage medium of claim 13, wherein the determining a similarity between each of the human region images and a target character image further comprises:
  extracting multiple first feature vectors of each of the human body region images to obtain an n-dimensional first feature vector;

extracting multiple second feature vectors of the target character image to obtain an m-dimensional second feature vector; wherein n≤m, and both n and m are positive integers; and determining a Euclidean distance between the first feature vector and the second feature vector, the Euclidean distance being indicative of the similarity between each of the human body region images and a target character image.

16. The non-transitory computer-readable storage medium of claim 13, wherein the clipping box includes the human body region image and the similarity correspond to the human body region image, and wherein the identifying the human body region image as a clipping image in response to determining that a similarity between a human body region image and the target character image is greater than a predetermined threshold further comprises:

identifying the clipping box including the human body region image and the corresponding similarity, and selecting the human body region image with the similarity being greater than the predetermined threshold in the clipping box as the clipping image.

17. The non-transitory computer-readable storage medium of claim 16, wherein the setting a clipping box based on a detection box corresponding to the human body region image further comprises:

identifying the moving speed of the detection box as a moving speed of the clipping box.

* * * * *